United States Patent [19]

Chaney et al.

[11] Patent Number: 5,515,106
[45] Date of Patent: May 7, 1996

[54] METHOD AND APPARATUS FOR TRANSMITTING/RECEIVING A PROGRAM GUIDE FOR TELEVISION SERVICES

[75] Inventors: John W. Chaney; Kevin E. Bridgewater, both of Indianapolis, Ind.

[73] Assignee: Thomson Consumer Electronics, Inc., Indianapolis, Ind.

[21] Appl. No.: 249,915

[22] Filed: May 26, 1994

[30] Foreign Application Priority Data

Jan. 5, 1994 [GB] United Kingdom ................. 9400101

[51] Int. Cl.$^6$ ........................................ H04N 7/04
[52] U.S. Cl. ............................ 348/461; 348/906
[58] Field of Search ........................ 348/461, 473, 348/6, 7, 10, 13, 906; 455/3.1, 3.2, 6.1; H04N 7/04

[56] References Cited

U.S. PATENT DOCUMENTS

| | | | |
|---|---|---|---|
| 4,264,925 | 4/1981 | Freeman et al. | 358/86 |
| 4,709,418 | 11/1987 | Fox et al. | 348/7 |
| 4,864,562 | 9/1989 | Murakami et al. | 370/84 |
| 5,231,494 | 7/1993 | Wachob | 348/385 |
| 5,359,601 | 10/1994 | Wasilewski et al. | 348/906 |

OTHER PUBLICATIONS

Boyer, R., *Digital Broadcast System*, 18th International Television symposium and Technical Exibition, Montreux, Switzerland, 10 Jun. 1993, pp. 458–462.

Bestler, C., *Flexible Data Structures and Interface Rituals for Rapid Development of OSD Applications*, 1993 NCTA Technical Papers 42nd Annual Convention and Exposition of the NCTA, San Francisco, California, 06 Jun. 1993, pp. 223–236.

Daily, M., *Addressable Decoder with Downloadable Operation*, 1993 NCTA Technical Papers, 42nd Annual Convention and Exposition of the NCTA, San Francisco, California, 06 Jun. 1993, pp. 82–89.

Cox, J. and Strkic, G., *Extended Services in a Digital Compression System*, 1993 NCTA Technical Papers, 42nd Annual Convention and Exposition of the NCTA, San Francisco, CA, 06 Jun. 1993, pp. 185–191.

*Primary Examiner*—Victor R. Kostak
*Attorney, Agent, or Firm*—Joseph S. Tripoli; Eric P. Herrmann; Ronald H. Kurdyla

[57] ABSTRACT

In a packet audio/video signal transmission system, program guide information is formed as a master guide and a special guide. The master guide contains programming information for the period of the current several hours. The special guide contains programming information for the next thirty days, for example. The master guide is sent as a service on each carrier or transponder to render it readily available regardless of the carrier frequency to which the receiver is tuned. The special guide is transmitted on only one of the carriers (transponders) to minimize use of system bandwidth.

18 Claims, 3 Drawing Sheets

METHOD AND APPARATUS FOR TRANSMITTING/RECEIVING A PROGRAM GUIDE FOR TELEVISION SERVICES

This invention relates to the formation, transmission and reception of a television program guide as for a broadcast television service.

BACKGROUND OF THE INVENTION

A direct broadcast satellite system has been proposed which will transmit compressed television and other ancillary signals in compressed and packeted form. The system has a potential of transmitting hundreds of programs. Each program may include a number of services. A service is defined herein as a program component, such as a video signal, or an audio signal, or a closed caption signal, or data, etc. The data may include executable computer files or programs for use by appropriate receivers. Each service of each program is identified by a unique service identifier (SCID). Thus if a program includes four service components, the program will be assigned four SCIDs. The information for respective services will be transmitted in packets of predetermined amounts of data (for example 130 bytes) and each packet of information will include a SCID corresponding to the service.

A plurality of programs, for example six to eight, may be transmitted in time division multiplexed form (on a packet basis) on a single carrier frequency. To provide, e.g. 160 programs, the system will transmit on 20 to 28 carriers.

In order to receive a particular program, a receiver is tuned to a particular carrier, and programmed to select signal packets associated with the program. Information associating the service components (SCIDs) with a particular program are contained in a program guide, which is itself a program that is transmitted. Because of the large number of programs and the consequential larger number of services, the programming information associating programs with services is ever changing, and must be continually updated.

The program guide includes information to be used by respective receivers to associate transmitted time division multiplexed service packets with programs desired to be viewed. The program guide is a program which is assigned a particular SCID that a receiver will automatically select on start up, and load the program data in memory. The receiver will include a microprocessor, which is responsive to programming commands, to scan the stored program guide and determine the carrier on which a desired program is transmitted and the associated SCIDs of the program's service components. Thereafter the tuner within the receiver will be tuned to the appropriate carrier frequency and packet selection apparatus will route the selected service component packets to corresponding signal processing apparatus.

The program guide information that has been discussed thus far is only machine usable, that is, the SCID information is useful to receiver apparatus but not of interest to the user. Information of interest to the respective user is the schedule of programs, the times of broadcast, the cost of pay per view programs, what movies or sporting events will be shown, etc. All of this data may also be included in the program guide and arranged in a form conducive to display and perusal. The display and perusal may be performed by conventional menu programming using the receiver On Screen Display apparatus.

The amount of program guide information for a month, for example, is enormous and places constraints on how, when and where it is transmitted and how, when and by what it is processed in respective receivers. One transmission parameter of paramount importance, which is impacted by the program guide is signal bandwidth. One receiver parameter of paramount importance is cost. The requisite use of program guide information should not significantly impact on either system bandwidth or receiver cost. In addition, the program guide should be available to the user with minimal delay.

SUMMARY OF THE INVENTION

Program guide information is formed as a master guide and a special guide. The master guide contains programming information for the period of the current several hours. The special guide contains programming information for an extended period of days, for example. The master guide is sent as a service on substantially every carrier or transponder to render it readily available to respective users regardless of the carrier frequency to which the user's receiver is tuned. The special guide is transmitted on only one of the carriers (transponders) to minimize use of system bandwidth. (In actuality, the special guide is a plurality of special guides, each of which is transmitted on only one transponder.)

A receiver embodiment, which tends to minimize the amount of memory required of a receiver, is an arrangement which utilizes the video decompression apparatus to treat program guide data as compressed video information and load same in the video decompressor memory. A μPC/decompressor interface is included to allow the receiver μPC to scan the program data in the video decompressor memory. This arrangement minimizes the memory (other than video decompressor memory) that would otherwise be required by the μPC to display or process the special program guide. The video decompression apparatus normally accepts data at a relatively fast rate. The large amount of special program guide data can therefore be relatively rapidly downloaded into memory for use with minimal latency.

BRIEF DESCRIPTION OF THE DRAWINGS

The invention will be described with reference to the attached FIGURES wherein.

DETAILED DESCRIPTION

The present invention will be described in the environment of a direct broadcast satellite system, DBS; however, it will readily be appreciated that its use is not limited to this environment. The invention is at least applicable in general to a broad range of time division multiplexed television broadcast systems such as packet cable and high definition television systems for example.

Figure 1:
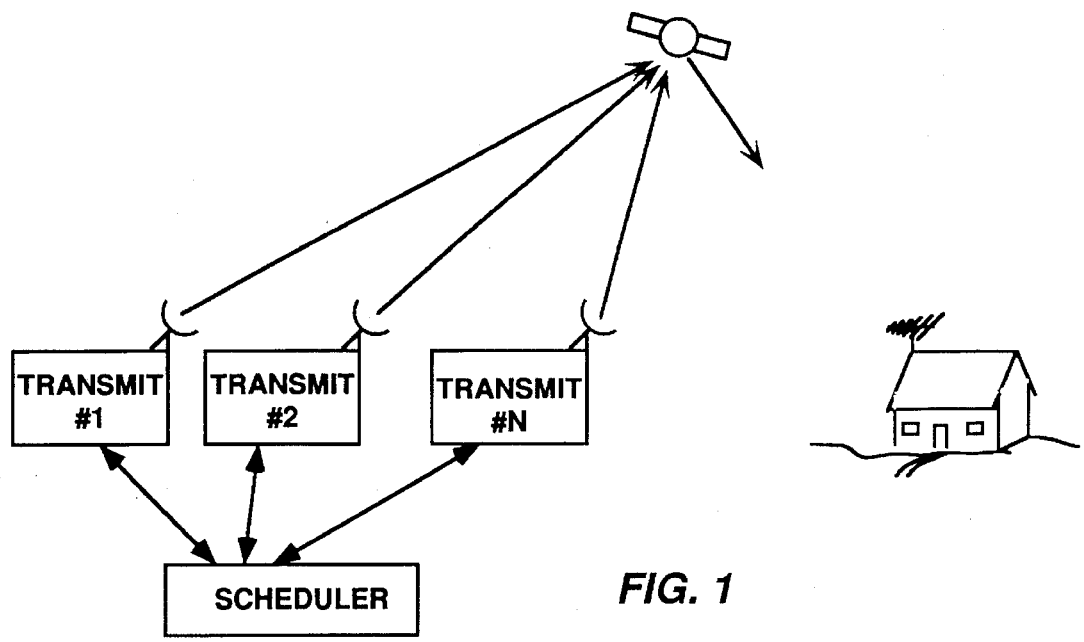
FIG. 1 is a pictorial diagram of a satellite transmission system.

Referring to FIG. 1, a DBS system includes a satellite containing a number of transponders. Respective transponders relay information between an earth bound transmitter and an earth bound receiver (e.g. in a home). Each transponder responds to signal transmitted on an exclusive carrier frequency.

The system may include a plurality of transmitters, (transmitters #1 to N) one for each transponder. The transmitters respectively transmit different program material such that the combination of transmitters provide a wide variety of television viewing material. The system includes a scheduler to coordinate program material amongst the respective transmitters.

Figure 2:
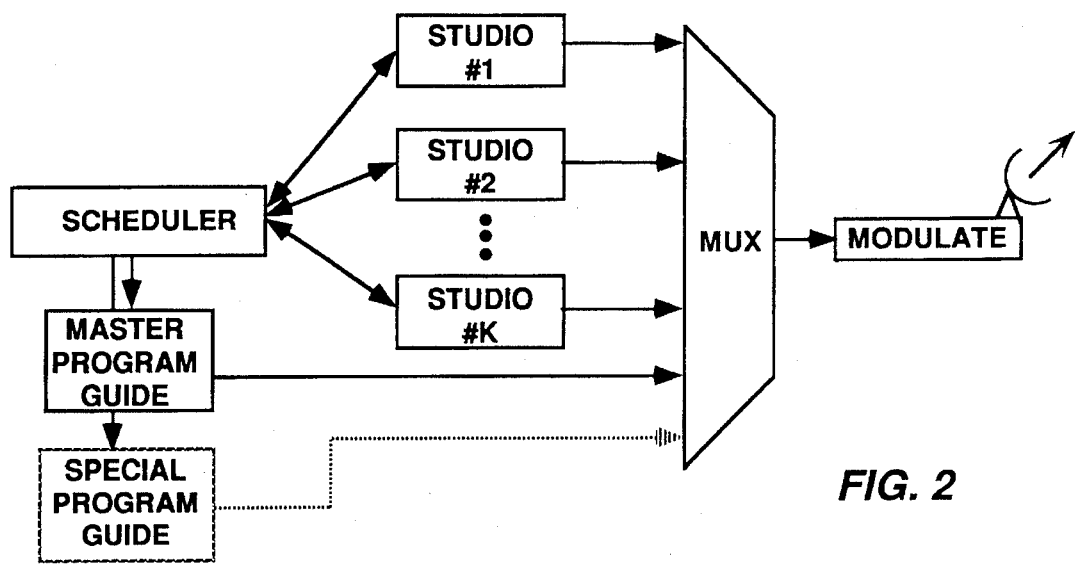
FIG. 2 is a block diagram of one of the transmit elements illustrated in FIG. 1.

FIG. 2 illustrates an exemplary transmitter of FIG. 1. In the present exemplary system, each transmitter is shown as a plurality of program generating organizations and/or equipment. These organizations/equipment are illustrated as studios, (STUDIOS 1 to K) each of which is capable of providing a packet audio/video/data (AVD) program. (U.S. Pat. No. 5,168,356 by Acampora et al. describes apparatus for generating packet audio/video programs.) The respective audio or video or data component of each program is a packet signal identified with an exclusive service channel identifier, SCID. Packets of the respective component packet signals are time division multiplexed in a program multiplexer (not shown) to form the respective AVD signal provided by one of the studios. The packet programs provided by the studios are time division multiplexed in a channel multiplexer (MUX). The output of the channel multiplexer is then modulated on an assigned transponder carrier frequency. The program multiplexing apparatus and/ or the modulator may include forward error correction, FEC, apparatus for generating error parity bytes and interleaving of portions of the signal to effect a degree of error immunity during the transmission process.

The scheduler of FIG. 2, which corresponds to the scheduler of FIG. 1, is an information management system including human intervention. The scheduler may include the system business office. The scheduler assigns programs to transponders, assigns SCIDs to program components, and also generates packet program guides. The scheduler maintains a running data base of all system programming for an extended period of time. The SCIDs of respective programs are associated with program names. In addition, the respective program names are associated with reception times and may be tagged with "type" codes for search purposes. For example, movies may be tagged with a movie code, sports programs with a sports code, soap operas with a soap code, horse operas with another code, etc. In addition, the respective program types may be categorized into subsets of the primary types such as movies being classified as thrillers, horror, comedies, etc., and the sports category classified into professional and amateur, for example.

An example of the types of information that may be maintained in respective records of the scheduler data base is shown in TABLE I. The exemplary record shown is for the 2-hour movie, Bambi, to be aired 27 Apr. 1994 at 7:30 PM. The database may also include common system messages to be transmitted to current subscribers.

TABLE I

| No. | ITEM | DESCRIPTION |
| --- | --- | --- |
| 1 | year | 1994 |
| 2 | month | 04 |

TABLE I-continued

| No. | ITEM | DESCRIPTION |
| --- | --- | --- |
| 3 | date | 27 Wed. |
| 4 | times | start 7:30P; end 9:30P |
| 5 | channel | SHO |
| 6 | PPV | yes/no |
| 7 | closed cap. | yes/no |
| 8 | provider | studio xyz |
| 9 | SCIDs | video-xxx..xx; audio-xxx..xx; data-xxx..xx; etc. |
| 10 | prog. name | BAMBI |
| 11 | description | Disney movie released year.........etc. |
| 12 | class | (audio/video/data) |
| 13 | subclass 1 | movie |
| 14 | subclass 2 | (rating) |
| 15 | subclass 3 | (children/western/SciFi/romance/nature/ .etc.) |
| 16 | billing info | ??? |

The scheduler scans the data base periodically and generates a master program guide. This master program guide is an arrangement of a simplified portion of the programming information relevant to programs which will be transmitted within the subsequent few hours. Items from the data base which may be included in the master guide are items 4 through 15 for the current day spanning a period of several hours and including all programs in progress. The arrangement is in a data file format which comports with receiver microprocessor (μPC) programming to condition the data for display as a menu programming guide, and to identify service component packets of programs selected for viewing.

Even though the data will, in part, be displayed on the television screen, it is not in compressed video format, because text is not particularly conducive to MPEG compression, and text in MPEG compressed form is not conducive to μPC manipulation. The master program guide is a data file which is packeted in a similar manner as the other program service components and assigned a specific predetermined SCID such as 000000000001.

Figure 3:
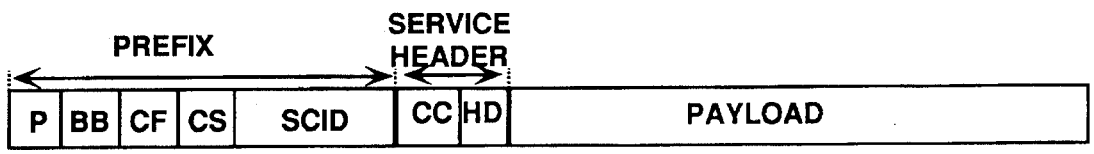
FIG. 3 is a pictorial diagram describing the general format of signal packets in which program component service data is transmitted.

FIG. 3 illustrates an exemplary packet format. Each packet includes a prefix which is of the same form for all service types. The prefix includes a one bit priority field P; a one bit boundary field BB, which indicates boundaries between significant signal changes; a one bit field, CF, which indicates if the payload is scrambled; a one bit field, CS, which indicates the one of two scramble keys that is to be used to unscramble a payload; and a twelve bit SCID. Following the prefix is a service header which is service specific. The service header includes a four bit continuity count value CC. The continuity count is service specific, with the count value in successive packets being successively incremented by one unit, modulo 16. For a video service the count values are followed by a four bit field, HD, which indicate certain payload options. The remainder of the packet is the signal payload. The packet may include error code parity bits appended to the end of the payload. Such error coding may be performed over the entire packet, or only over portions thereof.

The master program guide is sent in packet form to each of the transmitters wherein it is time division multiplexed with the respective program packets by the channel multiplexer if there is sufficient bandwidth. In scheduling the respective transponders, the scheduler attempts to reserve space for the program guide on each transponder, so that substantially every system transponder conveys the master program guide. Since the master program guide is transmitted on substantially all transponders, no matter to which transponder a receiver is tuned, the user can immediately switch to the master program guide to review available programming.

The master program guide is repeatedly sent and is updated regularly, for example every 30 minutes. The repetition rate is relatively frequent, the goal being that a subscriber turning on his receiver can access a programming menu substantially immediately. This is possible because the amount of data contained in the master guide is relatively limited.

A much more comprehensive program guide, termed a special guide, is also formed by the scheduler, and includes all programming information for a period of the following thirty days, for example. This is a significant amount of data, but the system designers had decided it would benefit subscribers to be able to schedule their viewing over longer periods (weeks or a month). The special program guide is a packet data program that is applied to only one of the transmitters and thus is available on only one of the transponders, albeit that the particular transponder may change day to day or hour to hour in accordance with transmitter bandwidth availability and other scheduling requirements. The SCID of the special guide is variable and is assigned by the scheduler. The location of the special guide is listed in the master guide along with other programming.

In a preferred embodiment, the master guide is formed as four sequential blocks of data designated;

SEGM:APGD:CSSM1 . . . CSSMnseg:PISM1 . . . PISMnseg.

The special guide on the other hand is partitioned into a plurality of segments (from 1 to 16) with an index "nseg" indicating the current number of segments comprising the special guide. Each segment carries program information for one or more channels, which range from 100 to 999 and each segment includes two sequential blocks of data;

CSSM1 . . . CSSMnseg:PISM1 . . . PISMnseg.

The CSSM block is a channel to service_id segment map. This includes data describing channels (channel name, call letters, channel number, type, . . . ) which are in the corresponding segment. The PISM block contains linked lists of program information (title, start time, duration, rating, category, . . . ) that are on each channel described in the corresponding CSSM.

The SEGM block contained in the master guide includes information about the partitioning of the channel space into segments and the number of segments. The SEGM data block is thus a segment map into the special guide. The block APGD contains a program guide map which indicates which special guide segments are active and their location (i.e., the particular transponder carrying the segment) as well as the SCIDs of respective segments. The APGD also contains program information relating to ratings and theme, such as items 10–15 in the above data base record.

The time span of the programming data included in the master guide is determined by the amount of memory available for processing the guide in the receiver. The exemplary system described allows for a master guide of 242 packets of 127 bytes each of data. Current data for all channels is included in the master guide, and as much future programming data as will fit within the 30K bytes of master guide space. This results in approximately two hours of program data.

Special guides are not limited by memory constraints, but rather by bandwidth. To minimize bandwidth demands upon the system by the special guide, the special guide segments are arbitrarily limited to 750 packets of 127 bytes, or approximately 95K bytes per segment and a total of 1.5M bytes for all 16 segments.

Each special guide segment is assigned a different SCID, and different ones of the segments may be transmitted on different transponders so that special guide data is substantially evenly distributed amongst all of the transponders.

Figure 4:
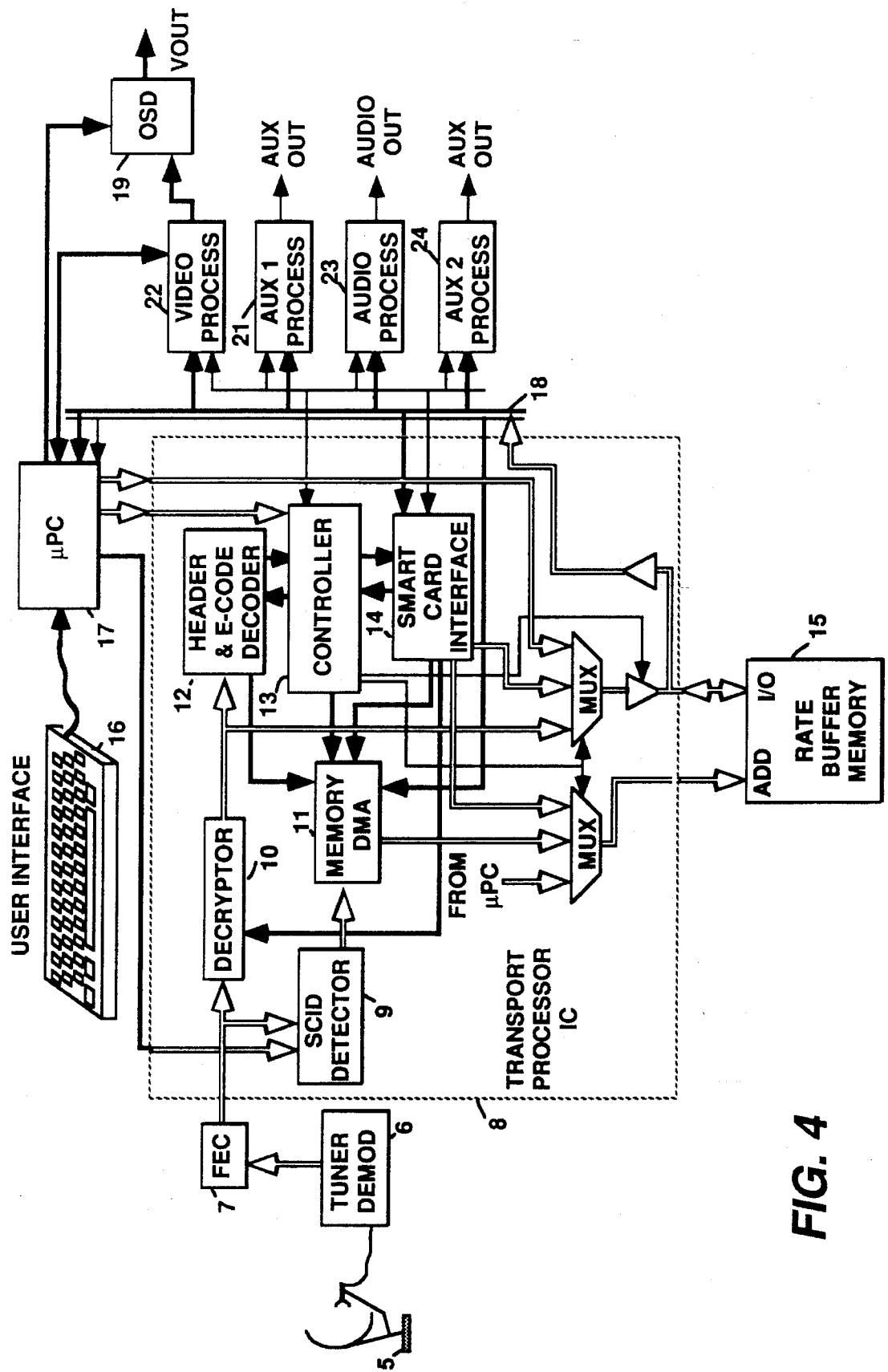
FIG. 4 is a block diagram of a portion of a receiver apparatus embodying the present invention.

FIG. 4 illustrates in block form, a portion of an exemplary AVD receiver. Transmitted AVD signal is captured by an antenna 5 and coupled to a tuner-demodulator 6. The tuner is controlled by the μPC to select a desired transponder carrier frequency. The selected carrier is demodulated and the modulating signal is output from the tuner-demodulator 6 in binary form. The modulating signal is applied to a forward error correcting circuit, FEC, 7, which corrects correctable errors and generates an error signal for respective signal packets which contain non-correctable errors. The FEC provides a time division multiplexed packet signal including a plurality of programs one of which is the master program guide.

The packet stream from the FEC is applied to a transport processor 8. The transport processor includes circuit elements for selecting ones of packets from the multiplexed packet stream, decrypting (descrambling) appropriate packets, and separating the service payloads from selected packets. In the transport processor, the packet stream from the FEC is applied to a decryptor 10 and to an SCID detector 9. At system start up, the system controller or μPC 17 is programmed to condition the SCID detector to detect occurrences of packets containing the master guide SCID. On detection of master guide packets, the SCID detector 9, conditions the memory DMA circuitry 11 to store the master guide packet payloads in a predetermined block of a rate buffer memory 15. The μPC, responsive to user commands input via a user interface 16, scans this block of memory for program data to determine the SCIDs associated with program components of the program which the user wishes to view. These SCIDs are applied to the SCID detector 9 to condition it to select the desired program service components. The memory DMA 11, in cooperation with the transport controller 13 and the μPC assigns respective blocks of the rate buffer memory 15 to respective service components associated with the selected SCIDs. As packets which contain the selected SCIDs are detected, the DMA 11, loads their payloads in the corresponding memory blocks. As respective service component processors 21–24 need data, they request it of DMA 11 through the transport controller 13. Controller 13 arbitrates memory access contention between read and write demands of the various elements according to a predetermined priority to satisfy all elements. Blocks of the memory 15 that are assigned for storage of particular service components, such as video and audio, are in effect conditioned to operate as first-in-first-out memories (FIFOS), each with a storage capacity of several packet payloads.

In this example, the transport processor includes a header and error code decoder 12 which is a dual purpose matched filter. In one mode it determines which of packets of entitlement data a particular subscriber is entitled to accept. In a second mode it is programmed to search for particular start codes in payloads of video service data. Detection of the desired parameters in either mode condition the memory addressing circuitry to either reset or not reset particular memory address pointers. The transport processor also includes a smart card interface. The smart card interface interfaces a smart card with the receiver system. The smart card contains a processor which controls access to particular programs, maintains billing information, and in conjunction with a modem communicates with service providers. The smart card utilizes the entitlement data mentioned above. Neither the smart card interface 14 or the decoder 12 are particularly relevant to the invention, except for the fact that the smart card requires memory.

As mentioned previously, it is a design objective to produce receiver apparatus at relatively low cost. To do so the receiver memory has been minimized. This is accomplished, at least in part, by multiplexing a single memory for a plurality of uses. This memory, the rate buffer memory 15, is multiplexed between operating as a compressed video rate buffer, a compressed audio rate buffer, master guide storage, smart card memory, μPC working memory and μPC storage. Even with all of these uses the memory 15 can be kept to 256K bytes. This is only possible because the program guide is split between the master and special guides. The master guide data is relatively small and hence consumes little memory space. The entirety of the memory 15 is not large enough to contain the special guide.

The master guide, once received is retained in the rate buffer memory, albeit it is periodically updated. Master guide retention allows instantaneous channel changes because the associated SCIDs are always available. If the master guide were dropped after each channel selection, a delay would be incurred between channel selections while the master guide was reloaded.

During intervals that the special guide is to be processed, scanned, and/or manipulated, no other services will be processed, hence the entire buffer memory 15 is available for processing the special guide. Since the memory is not large enough to contain the entire special guide at one time, processing of parts of the special guide would either have to be done iteratively or else the memory would have to be expanded. The former would entail too long a process to be favorably accepted by consumers and the latter would undesirably increase the cost of the apparatus.

Both of the foregoing problems regarding the special guide are circumvented by appropriating use of video decompression memory for processing the program guide. Video decompression requires a relatively large dedicated memory. The memory requirements for decompression of MPEG coded signal are one frame of video display memory, two frames of storage for predicting bidirectionally coded or B frames, and further working storage for reformatting data applied to the decompressor. For decompressing 4×3 aspect ratio NTSC resolution images the required memory is about 16 Mbits. In FIG. 4 this memory is subsumed within the video processor 22, is large enough to accommodate the special guide, and is not otherwise used when the special guide is processed.

During intervals when it is desired to use the special guide, the SCID detector is conditioned to select special guide packets and store their payloads in the buffer memory 15 as though it were compressed video data. The video processor is conditioned by the μPC to request data from the buffer memory block allotted the special guide SCID. This data is written to the video processor memory as if it were compressed video data. In this mode, the video channel is given priority, thus the special guide data is stored as fast as it arrives and may be loaded relatively rapidly.

When the special guide is transmitted as segments multiplexed amongst all channels, the microprocessor 17 must access the master guide in the buffer memory 15 and scan the segment map and APGD data block to determine channels and SCIDs of the respective segments. The microprocessor 17 is programmed to tune to the requisite channels containing the desired special guide segments and to condition the SCID detector to select the corresponding packets. Preferably all segments on a channel will be extracted before tuning another channel. It is also preferred that the respective channels be tuned in ascending or descending order to minimize resynchronization time between channels.

A μPC interface is incorporated in the video processor 22 to permit reading data from the video processor memory by the μPC. The μPC contains programs (e.g. search routines with information filters of known type) to permit the viewer to conveniently manipulate the special guide data. Since all of the special guide data is concurrently available, manipulation of the data may be accomplished as fast as the viewer can change commands. Since no extra memory is included to accommodate the special guide, costs are accordingly contained.

The manipulation of the special guide requires display of portions of the guide. The special guide data is transmitted in a data format not as compressed or non-compressed video signal. To display special guide information, the μPC selects the information for display and applies this data to an on screen display device (OSD) 19. When the program guide is being manipulated the OSD will monopolize the entire screen for the display of special guide text or other data and/or program command structure. At other times, when video is being decompressed, the OSD operates in conventional fashion to overlay desired text material on video images.

Figure 5:
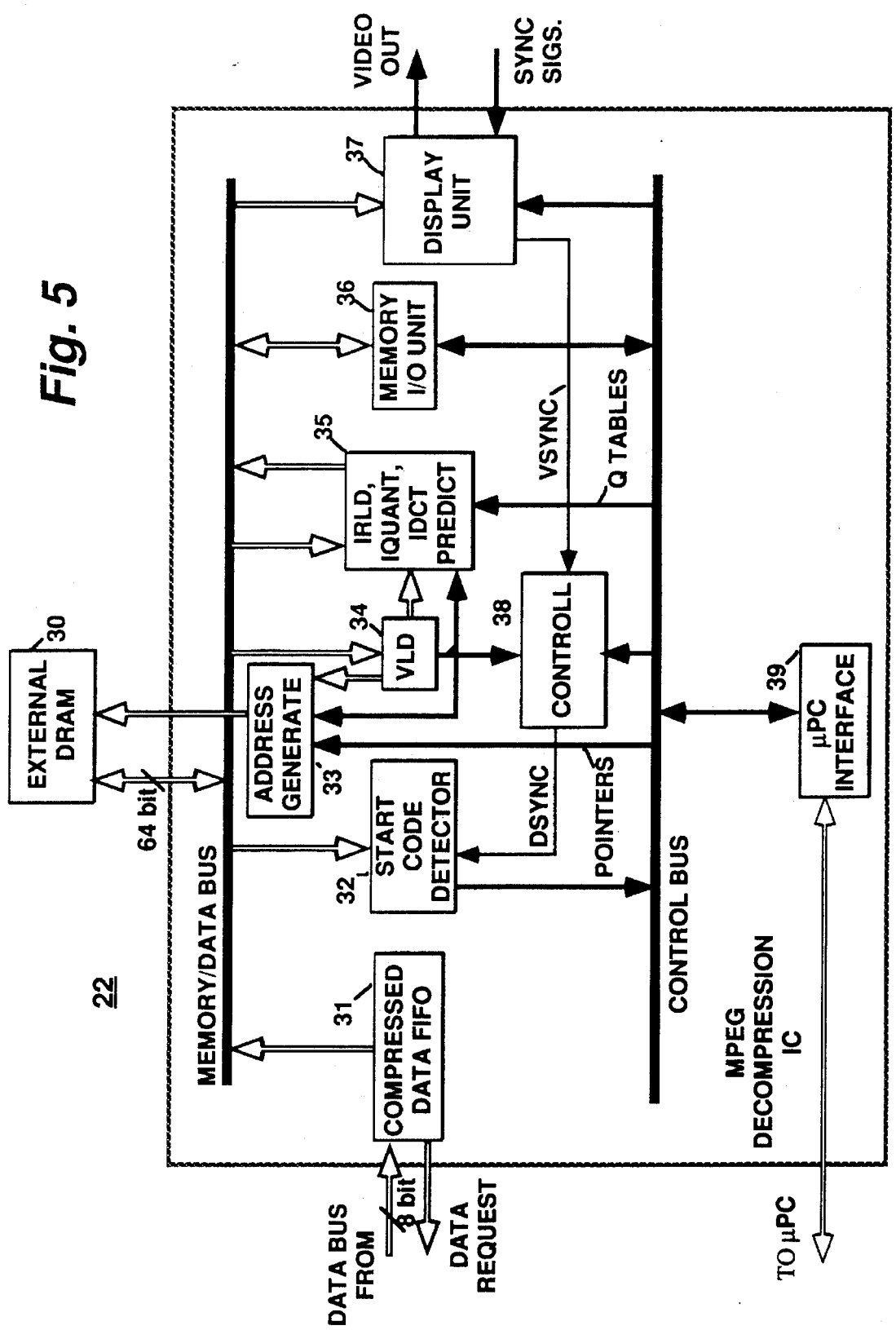
FIG. 5 is a block diagram showing the interfacing between the μPC and the video decompression apparatus of FIG. 4.

FIG. 5 illustrates an exemplary video processor 22 with a μPC interface to allow reading of data stored in the processor memory. All of the decompression memory is subsumed in a single memory 30 which is distinct from the buffer memory 15.

The video decompressor includes a FIFO 31, which has a data input bus coupled to the data output bus of the buffer memory 15 and a data request bus connected to the transport processor controller and a data output bus coupled to an internal memory/data bus. During video decompression operation the FIFO 31 requests data of the memory 15 as required for decompression. FIFO 31 accepts data as 8-bit bytes and applies 64-bit words to the memory/data bus. As these 64-bit words are created they are loaded into the external DRAM 30 at addresses provided by the address generator 33. Data is also read from the DRAM 30 under the control of the address generator 33 as required by the respective circuit apparatus within the decompression IC. In effect the address generator 33 is a state machine, responsive to stimuli provided by the respective decompression circuits, and programmed to write and read video data to and from memory according to a predetermined set of decompression stimuli vectors.

The decompression IC includes a start code detector 32 a variable length decoder, 34 and an element 35 which includes an inverse run length decoder IRLD, an inverse quantizer, IQUANT, an inverse discreet cosine transformer, IDCT, and a predictor, PREDICT. Data from the memory is shuttled to and from and between various ones of these functional elements, in a known manner, to decompress the compressed MPEG video data. The operations of the respective decompression functions is coordinated by a controller 38, which in large part is also a state machine. The controller 38 is responsive to stimuli produced by various of the decompression elements and data received from the memory/data bus via a memory I/O unit 36. Compressed video data is in 4:2:0 format, thus raw decompressed video data is provided in 4:2:0 format. This raw decompressed video data is applied to a display unit 37, which interpolates the raw video to provide a video output in 4:2:2 format. Decompression circuitry of this general form is currently available from different vendors and is not the object of this invention.

A control bus interconnects the controller 38 with all of the decompressor functional elements including the memory I/O unit 36. A μPC interface is also connected to the control bus, which provides a means of communication with a μPC external to the decompressor IC. It is anticipated that some level of interactivity will be incorporated into the transmission service, and at times this interactivity may not involve video. In these instances it may be desired to inhibit any operation of the decompressor IC, or condition it to provide a predetermined static display for example. These and other functions may be programmed into the controller and triggered by the μPC via the μPC interface.

To write special guide data to the DRAM 30 all that is required is that the decompression IC be instructed that the SCID associated with the special guide represents a video service. The decompression IC will accept the special guide data as if it were compressed video and write it to the DRAM. Normal decompression processing must be suspended to preclude decompression operations redistributing the stored special guide information within the DRAM. Decompression suspension is effected by the μPC when the special guide SCID is associated with the video decompressor.

Reading of special guide data from the DRAM 30 involves suspending normal operation of the controller 38 via the μPC interface 39, and accessing the DRAM 30 via the address generator 33 and the memory I/O 36. One of the normal functions of the controller 38 is to apply memory address start pointers to the memory address generator, to access specific compressed data in the DRAM, which compressed data establishes the parameters by which decompression should be performed. This same facility may be utilized for accessing the DRAM 30 to read special guide data. That is, the controller is arranged to accept address pointers from the μPC and apply same to the address generator. In this manner specific memory locations of the DRAM may be addressed by the μPC. Data read from the DRAM 30 is coupled to the control bus via the memory I/O, which converts 64-bit memory output words to e.g., 8-bit bytes. The respective 8-bit bytes are thereafter transferred via the μPC interface 39 to the μPC 17 wherein they may be used as menu program data or applied to the rate buffer memory 15 for subsequent use. During reading of the special guide data from DRAM, the normal operation of elements 32, 34, 35 and 36 may be suspended by the controller 38 responsive to μPC commands provided by the μPC interface 39.

The expanded capability of the overall system, that is, use of the dedicated video compressor memory for receiving and storing the special program guide, is effected with substantially no additional hardware. All that is required is a slight change in the programming of the controller 38 to accept read address pointers from the μPC interface, and an ability to suspend normal operations of ones of the decompression functions, changes that one skilled in the video decompression circuits art can readily make to his specific hardware/software embodiments.

What is claimed is:

1. A system for transmitting a plurality of audio/video (A/V) programs comprising:

a plurality of transmitting channels;

a plurality of packet A/V program generators;

a scheduler for generating a list of said packet A/V programs including information relating to transmission times, program identifiers, and miscellaneous information related to respective packet A/V programs; said scheduler being programmed to generate a master guide packet signal containing a portion of data from said list relevant to a predetermined viewing period, and to generate a special guide packet signal containing a greater portion of data from said list relevant to a viewing period significantly longer than said predetermined viewing period; and multiplexing means for multiplexing said master guide packet signal with respective said packet A/V programs on substantially every channel, and for multiplexing said special guide with A/V programs on only one of said channels.

2. A system for transmitting a plurality of audio/video (A/V) programs comprising:

a plurality of transmitting channels;

a plurality of packet A/V program generators;

a scheduler for generating a list of said packet A/V programs including information relating to transmission times, program identifiers, and miscellaneous information related to respective packet A/V programs; said scheduler being programmed to generate a master guide packet signal containing a portion of data from said list relevant to a predetermined viewing period, and to generate a special guide packet signal containing a greater portion of data from said list relevant to a viewing period significantly longer than said predetermined viewing period, and wherein said scheduler generates said special guide in segments of exclusive data, with each segment comprising a packet signal; and multiplexing means for multiplexing said master guide packet signal with respective said packet A/V programs on substantially every channel, and for multiplexing respective segment packet signals of said special guide amongst said plurality of channels.

3. The system set forth in claim 2 wherein said scheduler is further programmed to include information interrelating said respective segment packet signals in said master guide packet signal.

4. A method of transmitting audio/video (A/V) programs with programming scheduling information comprising:

generating a plurality of A/V program signals;

providing a plurality of signal transmission channels;

maintaining an information bank of times of transmission or respective A/V programs and miscellaneous descriptive information related to respective said A/V programs;

forming a master guide signal of information from said bank of information relating to a predetermined viewing period;

forming a special guide signal of information from said bank of information relating to a viewing period significantly longer than said predetermined viewing period;

time division multiplexing said master guide signal with A/V programs on substantially each of said channels; and time division multiplexing said special guide signal with A/V programs on only one of said channels.

5. The method set forth in claim 4 further including:

dividing said special guide signal into special guide segment signals, each of which includes a predetermined portion of said special guide signal; and time division multiplexing respective said special guide segment signals distributed amongst said plurality of channels with said A/V program signals.

6. Apparatus for receiving compressed audio/video (A/V) packet signals time division multiplexed with program guide information, said A/V signals transmitted in packet format with respective A/V components identified by respective SCIDs, said program information being transmitted in a master guide packet signal including limited viewing information relating to a predetermined viewing period and also transmitted in a special guide packet signal including expanded viewing information related to a relatively long viewing period compared with said predetermined viewing period, said apparatus comprising:

a detector for detecting transmitted said A/V packet signals with time division multiplexed program guide information;

a rate buffer memory;

a transport processor, coupled to said detector for selecting signal packets of desired A/V packet signals, master guide packet signals and special guide packet signals, said transport processor separating payload information from respective packets and directing payloads of packets of respective components to respective preassigned blocks of said rate buffer memory;

a video signal decompressor, coupled to said rate buffer memory, for decompressing A/V program video signal components, said video signal decompressor including memory means significantly larger than said rate buffer memory for use in decompressing compressed video signal, a memory interface for writing compressed video payloads from said rate buffer memory to said memory means, and a microprocessor interface for communicating data to said decompressor and for accessing data from said memory means;

a microprocessor, programmed to condition said transport processor to select master guide signal packets, and responsive to master guide signal packets stored in said rate buffer memory for conditioning said transport processor to select desired A/V programs, and wherein said microprocessor is responsive to user control to condition said transport processor to select special guide signal packets, and to condition said video decompressor to write special guide signal packet payloads in said memory means as compressed video.

7. The apparatus set forth in claim 6 wherein said apparatus further includes:

on-screen-display means; and said microprocessor, responsive to user control, scans at least a portion of special guide information stored in said memory means and conditions said on-screen-display apparatus to display the scanned special guide information.

8. The apparatus set forth in claim 6 wherein said special guide packet signal is transmitted in segments, each segment being a packet signal with packets of different segments being identified with a different identifier (SCID) and with different segments being transmitted on different channels, and wherein said master guide signal includes information identifying and relating said respective segments.

9. The apparatus set forth in claim 6 wherein said microprocessor is programmed to condition said video signal decompressor to respond to microprocessor memory addresses when said memory means is storing special guide information.

10. The apparatus set forth in claim 9 wherein said video signal decompressor includes:

an address generator, responsive to pointers for generating addresses for application to said memory means;

means coupled between said microprocessor interface and said address generator for coupling pointers provided by said microprocessor to said address generator.

11. Apparatus for receiving compressed audio/video (A/V) packet signals time division multiplexed with program guide information, said A/V signals transmitted in packet format with respective A/V components identified by respective SCIDs, said program information being transmitted in a program guide packet signal, said apparatus comprising:

a detector for detecting transmitted said A/V packet signals with time division multiplexed program guide information;

a rate buffer memory;

a transport processor, coupled to said detector for selecting signal packets of desired A/V packet signals and said program guide packet signal, said transport processor separating payload information from respective packets and directing payloads of packets of respective components to respective preassigned blocks of said rate buffer memory;

a video signal decompressor, coupled to said rate buffer memory, for decompressing A/V program video signal components, said video signal decompressor including memory means significantly larger than said rate buffer memory for use in decompressing compressed video signal, a memory interface for writing compressed video payloads from said rate buffer memory to said memory means, and a microprocessor interface for communicating data to said decompressor and for accessing data from said memory means;

a microprocessor, programmed to condition said transport processor to select said program guide packet signal, and to condition said video decompressor to write program guide packet signal payloads in said memory means as compressed video, and to access said memory means for generating display information from program guide information stored in said memory means.

12. A method for transmitting a audio-video programs comprising:

providing respective audio and video program identifiers (SCIDs) for respective program components;

providing compressed audio and video program components, segmenting such components into payloads and forming respective component packets including a payload and a corresponding SCID;

forming a database including program information for an extended period of days, said database including program names, component SCIDs, program times and channel information;

segmenting at least part of the information in said database into special guides of program information associated with respective channels, and forming packets of special guide program information with an associated SCID;

forming a table of information identifying said special guides and associated SCIDs;

forming a master guide including said table and a portion of programming information included in said special guide and dividing said master guide into payloads;

forming master guide payloads into packets including master guide SCIDs;

providing a plurality of transmission channels;

time division multiplexing packets of said master guide, packets of respective audio and video programs and packets of said special guides for transmission on said plurality of transmission channels whereby said master guide is duplicated on a majority of said plurality transmission channels and said special guides are substantially not duplicated on said plurality of transmission channels.

13. A method of transmitting program information on a system including a plurality of transmission channels comprising;

forming a master guide containing program information for a period of less than twelve hours of current programming information;

forming a special guide containing program information for a period equal to or greater than twenty four hours;

multiplexing said master guide with program signals on multiple ones of said plurality of transmission channels;

multiplexing said special guide on only one of said plurality of transmission channels along with said master guide and said program signals.

14. The method set forth in claim 13 further including:

forming said special guide in a plurality of segments; and multiplexing respective segments on said plurality of transmission channels wherein respective segments are applied to only one of said plurality of transmission channels.

15. A method of operating receiver apparatus for receiving a signal including at least compressed video data, and program guide data transmitted as a smaller master guide and a larger special guide, said receiver including a microprocessor controller, a rate buffer memory, a video decompressor and associated decompressor memory, said method comprising:

detecting a transmitted signal including at least compressed video data, and program guide data;

selecting from said signal said master guide and applying said master guide to said rate buffer memory for storage and access by said microprocessor controller;

scanning said master guide stored in said rate buffer memory with said microprocessor controller for determining parameters of said special guide to enable selection of said special guide from said signal;

selecting said special guide and storing said special guide in said decompressor memory;

scanning said special guide stored in said decompressor memory with said microprocessor controller for determining future program viewing information.

16. The method set forth in claim 14 further including the step of generating program guide information related to said plurality of segments, and incorporating such program guide information in at least said master guide.

17. The method set forth in claim 14 further including the step of generating program guide information related to said plurality of segments, and incorporating such program guide information in said master guide and in respective segments of said special guide.

18. A method of operating receiver apparatus for receiving a signal including at least compressed video data, master program guide and further data, said receiver including a microprocessor controller, a rate buffer memory, a video decompressor and associated decompressor memory, said method comprising:

detecting transmitted signal including at least said further data, and said master program guide;

selecting from said signal said master program guide and applying said master program guide to said rate buffer memory for storage and access by said microprocessor controller;

scanning said master program guide stored in said rate buffer memory with said microprocessor controller to enable selection of said further data from said signal;

selecting said further data and storing said further data in said decompressor memory;

accessing said further data stored in said decompressor memory with said microprocessor controller for use thereby.

* * * * *